US012025840B2

United States Patent
Liu (10) Patent No.: US 12,025,840 B2
(45) Date of Patent: Jul. 2, 2024

(54) DISPLAY PANEL AND ELECTRONIC DEVICE (71) Applicant: WUHAN CHINA STAR OPTOELECTRONICS TECHNOLOGY CO., LTD., Wuhan (CN)

(72) Inventor: Guangkun Liu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/605,532

(22) PCT Filed: Aug. 13, 2021

(86) PCT No.: PCT/CN2021/112555
§ 371 (c)(1),
(2) Date: Feb. 9, 2023

(87) PCT Pub. No.: WO2023/010612
PCT Pub. Date: Feb. 9, 2023

(65) Prior Publication Data
US 2024/0019645 A1 Jan. 18, 2024

(30) Foreign Application Priority Data
Aug. 6, 2021 (CN) .......................... 202110900628.7

(51) Int. Cl.
G06V 40/13 (2022.01)
G02B 6/42 (2006.01)

(52) U.S. Cl.
CPC ....... *G02B 6/4204* (2013.01); *G06V 40/1318* (2022.01)

(58) Field of Classification Search
None
See application file for complete search history.

(56) References Cited

U.S. PATENT DOCUMENTS

| 2017/0185234 A1* | 6/2017 | Zhang | G06F 21/62 |
| 2021/0141274 A1* | 5/2021 | Wei | G02F 1/133624 |
| 2022/0084318 A1* | 3/2022 | Wu | G06V 40/1318 |

FOREIGN PATENT DOCUMENTS

| CN | 107329202 A | 11/2017 |
| CN | 108803781 A | 11/2018 |

(Continued)

OTHER PUBLICATIONS

Chinese Office Action issued in corresponding Chinese Patent Application No. 202110900628.7 dated Mar. 16, 2022, pp. 1-10.

(Continued)

*Primary Examiner* — Joseph R Haley
(74) *Attorney, Agent, or Firm* — PV IP PC; Wei Te Chung; Zhigang Ma (57) ABSTRACT A display panel and an electronic device are provided. The electronic device includes the display panel. The display panel includes a display panel main body, a protective layer, a light source module, and a light sensor. Outgoing light emitted by the light source module can be totally reflected in the protective layer. When a finger touches an area of the protective layer corresponding to a display area, light emitted to the finger can be reflected to light sensor. As such, a range of under-screen fingerprint recognition can be increased.

18 Claims, 6 Drawing Sheets (56) References Cited

FOREIGN PATENT DOCUMENTS

| | | |
|---|---|---|
| CN | 109541738 A | 3/2019 |
| CN | 109993144 A | 7/2019 |
| CN | 210983435 U | 7/2020 |
| CN | 211319241 U | 8/2020 |
| CN | 111902823 A | 11/2020 |
| CN | 212160687 U | 12/2020 |
| CN | 112334909 A | 2/2021 |
| KR | 20190060315 A | 6/2019 |

OTHER PUBLICATIONS

International Search Report in International application No. PCT/CN2021/112555, dated Mar. 28, 2022.
Written Opinion of the International Searching Authority in International application No. PCT/CN2021/112555, dated Mar. 28, 2022.

\* cited by examiner

DISPLAY PANEL AND ELECTRONIC DEVICE

RELATED APPLICATIONS

This application is a Notional Phase of PCT Patent Application No. PCT/CN2021/112555 having international filing date of Aug. 13, 2021, which claims the benefit of priority of Chinese Patent Application No. 202110900628.7 filed on Aug. 6, 2021. The contents of the above applications are all incorporated by reference as if fully set forth herein in their entirety.

TECHNICAL FIELD

The present disclosure relates to the display technology field, and more particularly to a display panel and an electronic device.

BACKGROUND ART

In recent years, with the development of electronic technologies, mobile display electronic devices, such as mobile phones and tablets, have become indispensable social media and information storage carriers in people's daily lives. For such products, while fashionable appearance characteristics, such as portability, full screen, light and thin, are sought, a strong demand for the protection of personal privacy is required. Fingerprint recognition is widely used as an identification method for mobile electronic devices and has corresponding legal effects.

Technical Problem

Currently, the mainstream fingerprint recognition technologies include a capacitive type and an optical type. The capacitive type is basically used in a liquid crystal display (LCD) device and usually located on a back, a bottom frame, or a side of an electronic device. In this type, the aesthetic of the electronic device is destroyed, and there is no space for placing a capacitive fingerprint recognition module with increasing of a screen-to-body ratio. The optical type is basically used in an organic light emitting diode (OLED) display device. A fingerprint recognition area can be located in a display area, and thus the electronic device can have beautiful aesthetic. Although the above-mentioned two schemes are widely used currently, they both use a single-point fingerprint recognition method. Fingerprint recognition can only be fixed in a specific small area, and thus is lacks portability in operation.

In summary, the conventional display panels and the electronic devices have the problem that fingerprint recognition can only be fixed in a specific small area. Therefore, it is necessary to provide a display panel and an electronic device to improve the defect.

Technical Solution

Embodiments of the present disclosure provide a display panel and an electronic device for solving the problem that fingerprint recognition can only be fixed in a specific small area.

An embodiment of the present disclosure provides a display panel, including:
- a display panel main body;
- a protective layer disposed at a light emitting side of the display panel main body;
- a light source module, a light emitting surface of the light source module facing a light incident surface of the protective layer; and
- a light sensor disposed at a side of the display panel main body away from the protective layer;
- wherein outgoing light emitted by the light source module enters the protective layer in a first direction, and in a cross sectional viewing angle, an angle between the first direction and a thickness direction of the protective layer is greater than a critical angle of the outgoing light on a light emitting surface of the protective layer.

According to an embodiment of the present disclosure, the light source module includes:
- a light guide component, a light emitting surface of the light guide component facing the light incident surface of the protective layer; and
- at least one light source, the at least one light source disposed at at least one light incident side of the light guide component.

According to an embodiment of the present disclosure, a reflective layer is disposed on surfaces of the light guide component, and the reflective layer exposes the at least one light incident surface and the light emitting surface of the light guide component.

According to an embodiment of the present disclosure, the light guide component includes a reflecting surface opposite to the light emitting surface, the reflecting surface is arranged in an array structure, and the array structure has an uneven surface.

According to an embodiment of the present disclosure, the array structure includes a plurality of convex portions protruding from the reflecting surface in a direction opposite to the first direction, and the convex portions are semi-elliptical, pyramidal, or semi-sphere; or the array structure includes a plurality of concave portions dented from the reflecting surface in the first direction, and the concave portions are triangular, semi-circular, or semi-elliptical.

According to an embodiment of the present disclosure, the display panel further includes a first adhesive layer, and the first adhesive layer is adhered between the light emitting surface of the light source module and the incident surface of the protective layer;
wherein a refractive index of the first adhesive layer is greater than a refractive index of the protective layer.

According to an embodiment of the present disclosure, the refractive index of the first adhesive layer is greater than or equal to 1.5 and smaller than or equal to 1.8.

According to an embodiment of the present disclosure, the display panel further includes a second adhesive layer, and the second adhesive layer is adhered to the light incident surface of the protective layer;
wherein a refractive index of the second adhesive layer is smaller than a refractive index of the protective layer, and a refractive index of a finger is smaller than the refractive index of the protective layer.

According to an embodiment of the present disclosure, the refractive index of the protective layer is n1, the refractive index of the second adhesive layer is n2, the refractive index of the finger is n3, and an incident angle of the outgoing light emitted to the protective layer is α;
wherein $\arcsin(n2/n1) \leq \alpha \leq \arcsin(n3/n1)$.

According to an embodiment of the present disclosure, the refractive index of the second adhesive layer is greater than or equal to 1.1 and smaller than or equal to 1.3, and the refractive index of the protective layer is greater than or equal to 1.4 and smaller than or equal to 1.6.

According to an embodiment of the present disclosure, the display panel includes a display area and a frame area surrounding the display area, and the light source module is disposed in the frame area.

An embodiment of the present disclosure further provides an electronic device including a display panel. The display panel includes:
- a display panel main body;
- a protective layer disposed at a light emitting side of the display panel main body;
- a light source module, a light emitting surface of the light source module facing a light incident surface of the protective layer; and
- a light sensor disposed at a side of the display panel main body away from the protective layer;
- wherein outgoing light emitted by the light source module enters the protective layer in a first direction, and in a cross sectional viewing angle, an angle between the first direction and a thickness direction of the protective layer is greater than a critical angle of the outgoing light on a light emitting surface of the protective layer.

According to an embodiment of the present disclosure, the light source module includes:
- a light guide component, a light emitting surface of the light guide component facing the light incident surface of the protective layer; and
- at least one light source, the at least one light source disposed at at least one light incident side of the light guide component.

According to an embodiment of the present disclosure, a reflective layer is disposed on surfaces of the light guide component, and the reflective layer exposes the at least one light incident surface and the light emitting surface of the light guide component.

According to an embodiment of the present disclosure, the light guide component includes a reflecting surface opposite to the light emitting surface, the reflecting surface is arranged in an array structure, and the array structure has an uneven surface.

According to an embodiment of the present disclosure, the array structure includes a plurality of convex portions protruding from the reflecting surface in a direction opposite to the first direction, and the convex portions are semi-elliptical, pyramidal, or semi-sphere; or
the array structure includes a plurality of concave portions dented from the reflecting surface in the first direction, and the concave portions are triangular, semi-circular, or semi-elliptical.

According to an embodiment of the present disclosure, the display panel further includes a first adhesive layer, and the first adhesive layer is adhered between the light emitting surface of the light source module and the incident surface of the protective layer;
wherein a refractive index of the first adhesive layer is greater than a refractive index of the protective layer.

According to an embodiment of the present disclosure, the refractive index of the first adhesive layer is greater than or equal to 1.5 and smaller than or equal to 1.8.

According to an embodiment of the present disclosure, the display panel further includes a second adhesive layer, and the second adhesive layer is adhered to the light incident surface of the protective layer;
wherein a refractive index of the second adhesive layer is smaller than a refractive index of the protective layer, and a refractive index of a finger is smaller than the refractive index of the protective layer.

According to an embodiment of the present disclosure, the refractive index of the protective layer is $n_1$, the refractive index of the second adhesive layer is $n_2$, the refractive index of the finger is $n_3$, and an incident angle of the outgoing light emitted to the protective layer is $\alpha$;
wherein $\arcsin(n_2/n_1) \leq \alpha \leq \arcsin(n_3/n_1)$.

Advantageous Effects

Advantageous effects of the embodiments of the present disclosure are described as follows. The embodiments of the present disclosure provide a display panel and an electronic device. The electronic device includes the display panel. The display panel includes a display panel main body, a protective layer, a light source module, and a light sensor. The protective layer is disposed on a light emitting side of the display panel main body. A light emitting surface of the light source module faces a light incident surface of the protective layer. The light sensor is disposed at a side of the display panel main body away from the protective layer. Outgoing light emitted by the light source module enters the protective layer in a first direction, and an angle $\alpha$ between the first direction and a thickness direction of the protective layer is greater than a critical angle of the outgoing light on a light emitting surface of the protective layer. As such, the light emitted by the light source module can be totally reflected in the protective layer. When a user's finger used for fingerprint recognition touches an area of the protective layer corresponding to a display area of the display panel, the light emitted to the finger can be reflected to light sensor. A range of under-screen fingerprint recognition of the display panel and the electronic device can be increased, and convenience of the fingerprint recognition is increased.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF EMBODIMENTS

The following embodiments are referring to the accompanying drawings for exemplifying specific implementable embodiments of the present disclosure. Directional terms described by the present disclosure, such as upper, lower, front, back, left, right, inner, outer, side and etc., are only directions by referring to the accompanying drawings, and thus the used directional terms are used to describe and understand the present disclosure. However, the present disclosure is not limited thereto. In the drawings, structure-like elements are labeled with like reference numerals.

The following further describes the present disclosure with reference to the accompanying drawings and the embodiments.

An embodiment of the present disclosure provides a display panel and an electronic device. The electronic device includes the display panel 100. The electronic device can further include a housing. The display panel can be installed on the housing. A containing space can be provided in the housing. The containing space can be used for placing electronic components required for driving the flexible display panel, such as a main board, a printed circuit board, a battery and so on.

In the embodiment of the present disclosure, the electronic device can be a vehicle-mounted display terminal, such as a vehicle-mounted display, a driving recorder and so on. The electronic device can also be a mobile terminal, such as a smart phone, a tablet computer, a notebook computer and so on, or can be a wearable terminal, such as a smart watch, a smart bracelet, smart glasses, an augmented reality device and so on. The electronic device can also be a fixed terminal, such as a desktop computer, a television, and so on, or a vehicle display terminal, such as a vehicle display or a driving recorder and so on.

Figure 1:
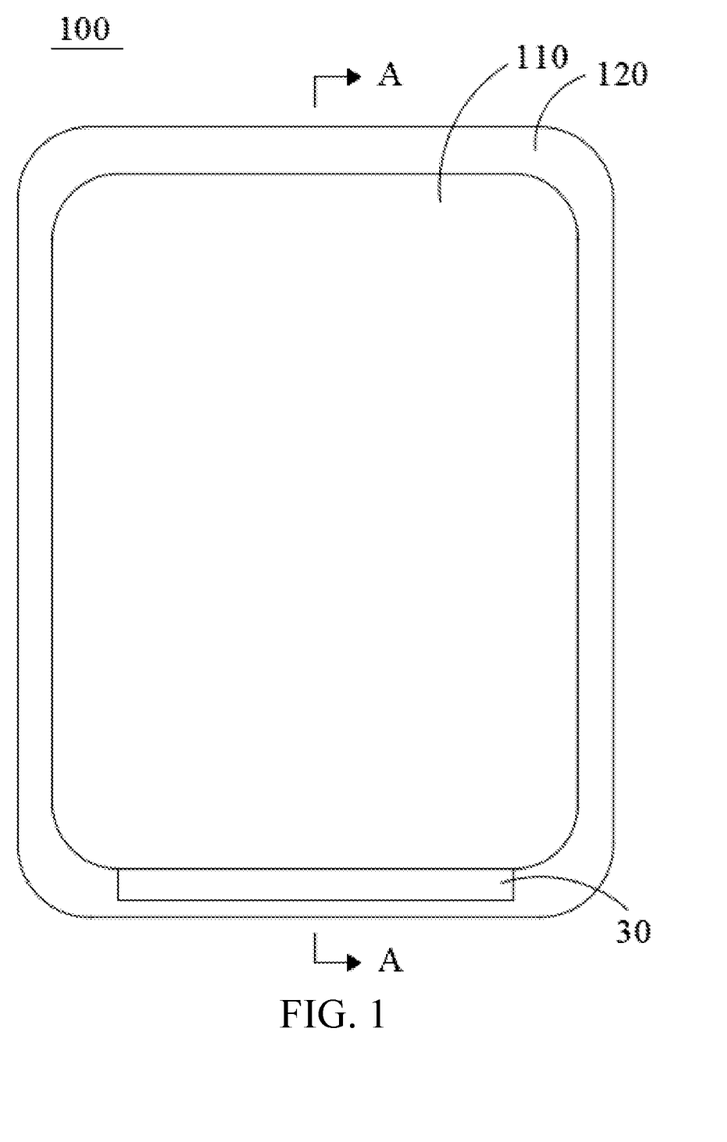
FIG. 1 illustrates a plan view of a display panel provided by an embodiment of the present disclosure.
Figure 2:
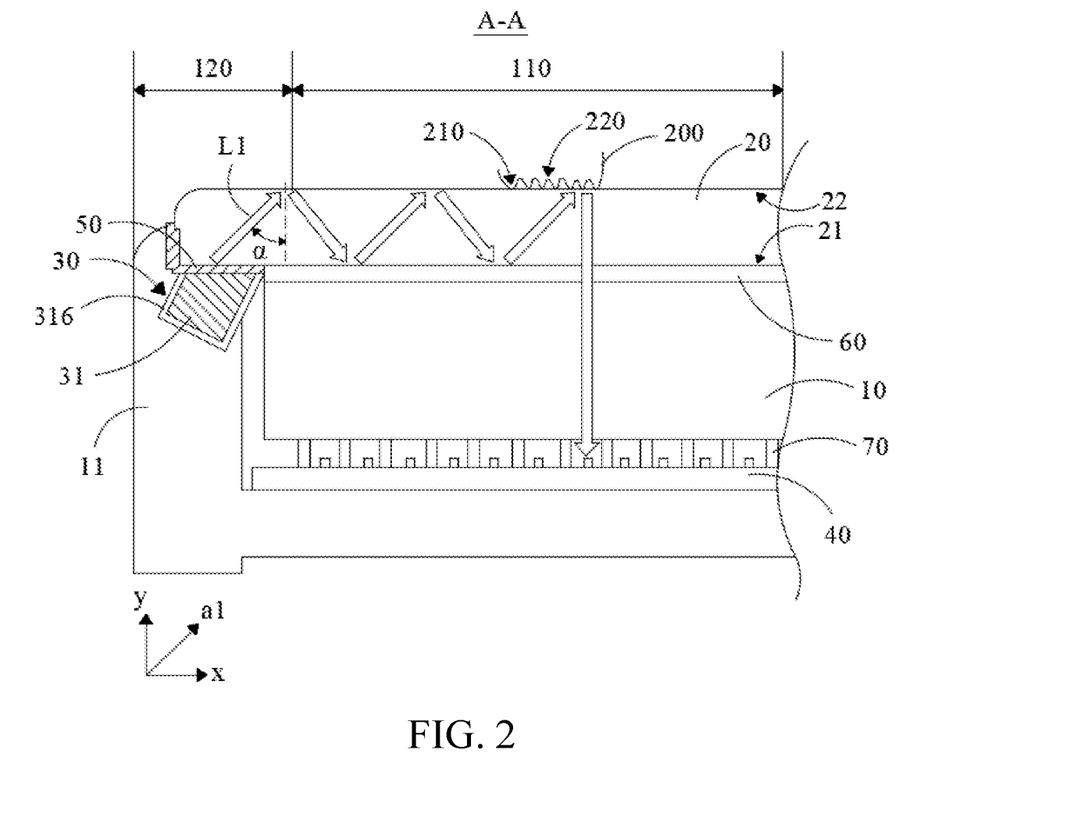
FIG. 2 illustrates a cross-sectional view of a first type of the display panel in a direction A-A provided by an embodiment of the present disclosure.

Please refer to FIG. 1 in combination with FIG. 2. FIG. 1 illustrates a plan view of a display panel provided by an embodiment of the present disclosure. FIG. 2 illustrates a cross-sectional view of a first type of the display panel in a direction A-A provided by an embodiment of the present disclosure. The display panel 100 includes a display panel main body 10, a protective layer 20, a light source module 30, and a light sensor 40. The protective layer 20 is disposed at a light emitting side of the display panel main body 10 for protecting the display panel main body 10. A light emitting surface of the light source module 30 faces a light incident surface 21 of the protective layer 20. The light source module 30 is configured to provide a light source for the light sensor 40. The light sensor 40 is disposed at a side of the display panel main body 10 away from the protective layer 20.

In one embodiment, the display panel main body 10 is a liquid crystal display panel. The liquid crystal display panel can include a backlight module, an array substrate, a liquid crystal layer, and a color filter substrate. Light emitted by the light source module 30 irradiates the protective layer 20. After the light is reflected by a finger 200, the light can pass through the display panel main body 10 and be received by the light sensor 40. In practical applications, a type of the display panel main body is not limited to the above-mentioned liquid crystal display panel and can also be other types of display panels, such as an organic light emitting diode display panel or a micro light emitting diode display panel.

The display panel 100 further includes a frame 11. A slot is provided at a vertical side wall of the frame 11. The light source module 30 can be fixed at and assembled to the slot.

In one embodiment, the protective layer 20 is a cover plate, and the cover plate is made of a transparent material. In practical applications, the protective layer 20 is not limited to the above-mentioned cover plate and can also be a transparent hard coating layer.

As shown in FIG. 2, outgoing light L1 emitted by the light source module enters the protective layer 20 in a first direction a1, and an angle α between the first direction a1 and a thickness direction y of the protective layer 20 is greater than a critical angle of the outgoing light L1 on a light emitting surface of the protective layer 20. As such, the outgoing light L1 emitted by the light source module 30 can be totally reflected in the protective layer 20, so that the light emitted by the light source module can be distributed in any areas of the protective layer 20.

As shown in FIGS. 1 and 2, the display panel 100 includes a display area 110 and a frame area 120 surrounding the display area 110. When the finger 200 contacts an area of the protective layer 20 corresponding to the display area 110, the finger 200 can break total reflection of the light in the protective layer 20 emitted by the light source module 30. Light emitted to the finger 200 is emitted out from the light incident surface 21 of the protective layer 20, passes through the display panel main body 10, and is received by the light sensor 40, thereby implementing a light detection of a finger 200.

In the embodiment of the present disclosure, as shown in FIG. 2, fingerprints of the finger 200 include ridges 210 distributed at intervals and valleys 220 located between adjacent ridges 210.

It can be understood that when the user's finger 200 contacts any one area of the protective layer 20 corresponding to the display area 110, there is no air gap between the ridges 210 and the light emitting surface 22 of the protective layer 20. The ridges 210 break the total reflection of the light in the protective layer 20 emitted to the ridges. A part of the light is reflected to be received by the light sensor 40, so that more light is reflected to the light sensor 40 in areas corresponding to the ridges 210. There is an air gap between the valleys 220 and the light emitting surface 22 of the protective layer 20. Total reflection of a part of the light emitted to areas of the protective layer 20 corresponding to the valleys 220 is destroyed and reflected to the light sensor 40, while the other part of the light is totally reflected, so that less light is reflected to the light sensor 40 in areas corresponding to the valley 220. As such, biometric information in which the ridges are bright and valleys are dark is formed. That is, fingerprint information is formed. Light carrying the fingerprint information enters the display panel main body 10 below the protective layer 20 and reaches the light sensor 40 through a collimated light path, thereby increasing a range of under-screen fingerprint recognition of the display panel 100 and the electronic device.

Please refer to FIG. 1 in combination with FIG. 2. In the embodiment of the present disclosure, the display panel 100 can include only one light source module 30. The light source module 30 can be disposed in the frame area 120 near a lower edge of the display area 110. In practical applications, the light source module 30 can also be disposed in the frame area 120 near an upper edge, a left edge, or a right edge of the display area 110. Furthermore, the display panel 100 can also include a plurality of light source modules 30. The plurality of light source modules 30 can be distributed in the frame area 120 near peripheral edges of the display area 110.

Figure 3:
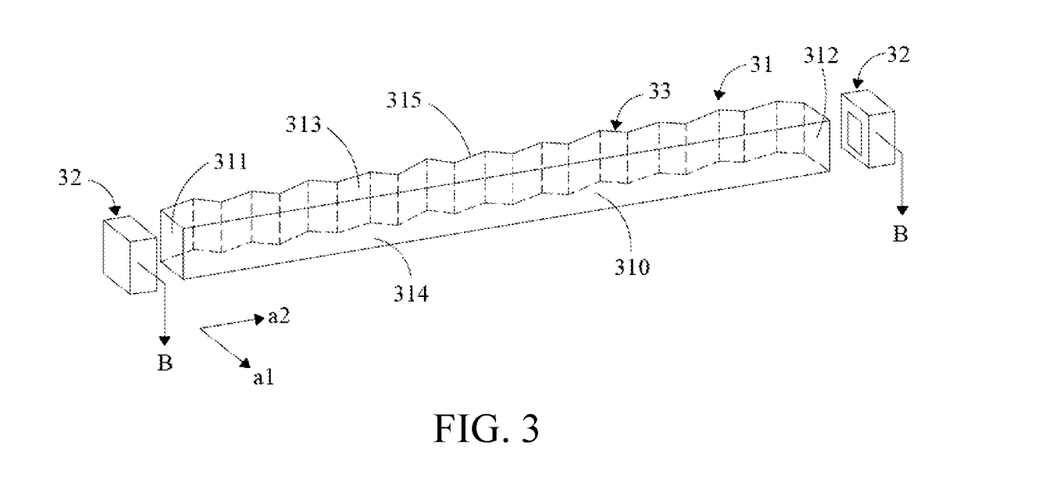
FIG. 3 illustrates a structure diagram of a light source module provided by an embodiment of the present disclosure.

Please refer to FIG. 2 in combination with FIG. 3. FIG. 3 illustrates a structure diagram of a light source module provided by an embodiment of the present disclosure. The light source module 30 includes a light guide component 31 and light sources 32. The light sources 32 are disposed at light incident sides of the light guide component 31. A light emitting surface of the light guide component 31 faces the light incident surface 21 of the protective layer 20.

The light sources 32 are infrared light sources for providing infrared light required for the fingerprint identification. The infrared light can be invisible to human eyes and can pass through the display panel main body 10, so that the under-screen fingerprint recognition function can be realized and it can be ensured that display effect of the display panel 100 is not affected. In practical applications, the light sources 32 are not limited to the infrared light sources and can also be ultraviolet light sources or other invisible light sources.

In the embodiment of the present disclosure, the light guide component 31 is a rod-shaped structure (that is, a light guide rod) and includes a light emitting surface 310, a first light incident surface 311 and a second light incident surface 312 located at opposite ends of the light emitting surface 310, a first connecting surface 313 and a second connecting surface 314 located at the opposite ends of the light emitting surface 310 and connected to the first light incident surface 311 and the second light incident surface 312, and a reflecting surface 315 disposed opposite to the light emitting surface 310. The first light incident surface 311 and the second light incident surface 312 are parallel to a first direction a1 and perpendicular to a second direction a2. The first connecting surface 313 and the second connecting surface 314 are parallel to a plane defined by the first direction a1 and the second direction a2. The light emitting surface 310 is parallel to the second direction a2 and perpendicular to the first direction a1.

In the embodiment of the present disclosure, an angle between the first direction a1 and the thickness direction y of the protective layer 20 is also a. The thickness direction y of the protective layer 20 is a vertical direction. The thickness direction y of the protective layer 20 is perpendicular to the horizontal direction x. The reflecting surface 315 is vertically connected to the first connecting surface 313 and the second connecting surface 314. After the light emitted by the light sources 32 is reflected by the reflecting surface 315, the reflected light can be emitted out from the light source module 30 in the first direction a1. That is, the outgoing light L1 is formed. An incident angle of the outgoing light L1 is α when it enters the protective layer 20. The incident angle α is greater than 42°.

The light source module 30 includes two light sources 32. The two light sources 32 are respectively disposed opposite to each other and on the first light incident surface 311 and the second light incident surface 312. The two light sources 32 respectively emit the infrared light into the light guide component 31 through the first light incident surface 311 and the second light incident surface 312, so as to increase the amount of the infrared light in the light guide component 31. As such, more light can be reflected to the light sensor 40, thereby improving the accuracy of the fingerprint recognition of the electronic device.

In the embodiment of the present disclosure, the display panel 100 can further include a first adhesive layer 50. The first adhesive layer 50 is adhered between the light emitting surface of the light source module 30 and the incident surface 21 of the protective layer 20. A refractive index of the first adhesive layer 50 is greater than a refractive index of the protective layer 20.

As shown in FIG. 2, the light emitting surface 310 of the light guide component 31 is adhered to the light incident surface 21 of the protective layer 20 through the first adhesive layer 50. By disposing the first adhesive layer 50 with the refractive index greater than the refractive index of the protective layer 20 between the light guide component 31 and the protective layer 20, a refraction degree of the outgoing light L1 emitted from the light guide component 31 into the protective layer 20 can be reduced, so that more light emitted from the light sources 32 can enter the protective layer 20 to be totally reflected to increase the light utilization rate of the light source module 30.

Specifically, the refractive index of the first adhesive layer 50 is 1.6. In practical applications, the refractive index of the first adhesive layer 50 is not limited to 1.6 but can also be 1.5, 1.7, 1.8 and so on. The refractive index of the first adhesive layer 50 is only required to be greater than or equal to 1.5 and smaller than or equal to 1.8.

Furthermore, a reflective layer 316 is disposed on the surfaces of the light guide component 31. The reflective layer 316 exposes the light incident surfaces and the light emitting surface of the light guide component 31.

As shown in FIG. 1, in the embodiment of the present disclosure, the first light incident surface 311, the second light incident surface 312, reflective layer 316 is disposed on the first connecting surface 313, the second connection surface 314, and the reflecting surface 315. The reflective layer 316 can prevent the light emitted by the light sources 32 from being emitted from the other surfaces of the light guide component 31 except for the light emitting surface 310, so as to increase the light utilization rate of the light source module 30. The reflective layer 316 can be directly formed on the above-mentioned surfaces by evaporation, coating or other processes. A material of the reflective layer 316 can include but is not limited to at least one of metallic materials, such as Ag, Al and so on.

Further, the reflecting surface 315 is arranged in an array structure 33. The reflecting surface 315 is used to destroy the total reflection of the light in the light guide component 31 emitted by the light sources 32 and to control the light to be emitted out in the direction a1.

Figure 4:
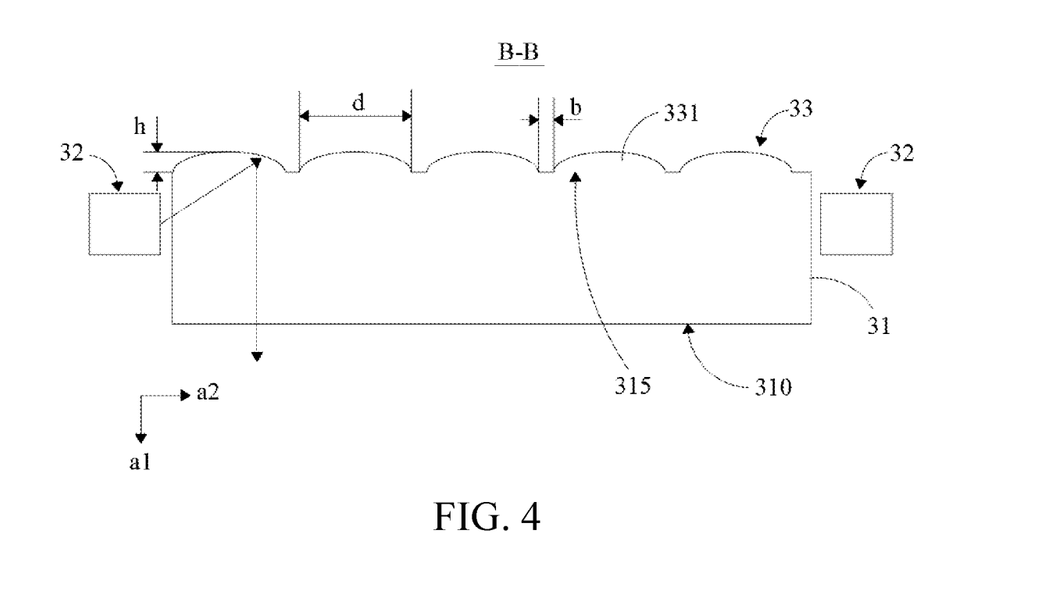
FIG. 4 illustrates a cross-sectional view of a first type of the light guide component in a direction B-B provided by an embodiment of the present disclosure.

In one embodiment, as shown in FIGS. 3 and 4, FIG. 4 illustrates a cross-sectional view of a first type of the light guide component in a direction B-B provided by an embodiment of the present disclosure. The array structure 33 includes a plurality of convex portions 331 protruding from the reflecting surface 315 in a direction opposite to the first direction a1. The convex portions 331 are used to disrupt the total reflection of the light in the light guide component 31 emitted by the light sources 32. When the light emitted by the light sources 32 irradiates side walls of the convex portions 331, the convex portions 331 can reflect the light in the first direction a1 and the reflected light can be emitted out from the light emitting surface 310 of the light guide component 31. The convex portions 331 and the light guide component 31 can be integrally formed by an injection molding process.

Figure 5:
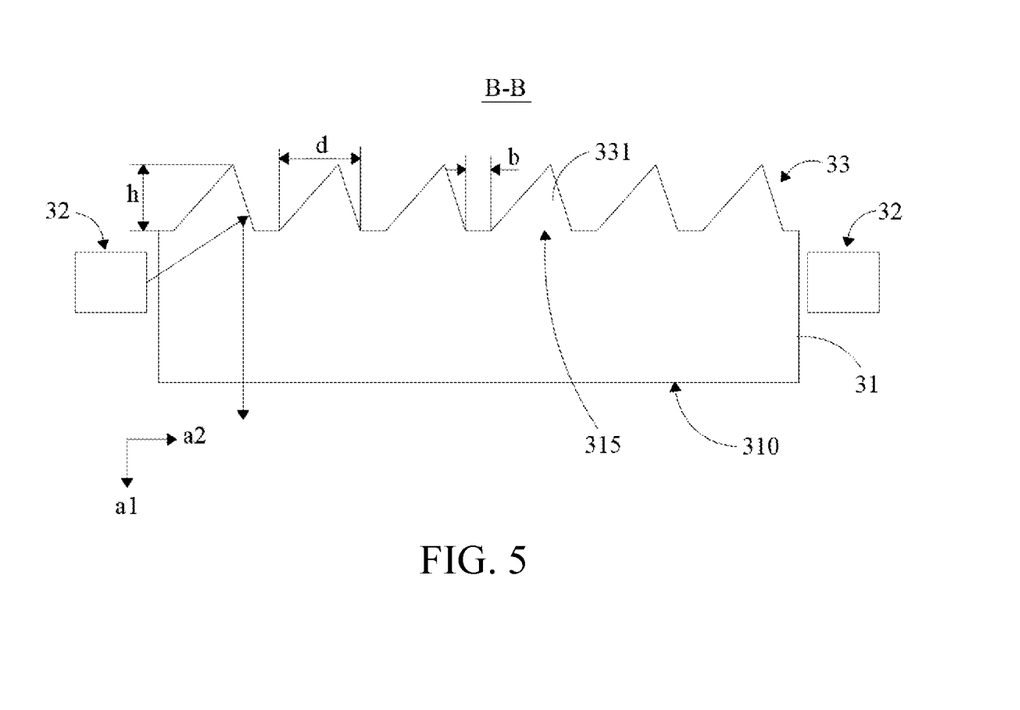
FIG. 5 illustrates a cross-sectional view of a second type of the light guide in the B-B direction provided by an embodiment of the present disclosure.

Specifically, as shown in FIG. 4, the convex portions 331 are semi-ellipsoids. A cross section is semi-elliptical in the B-B direction. In some other embodiments, as shown in FIG. 5, FIG. 5 illustrates a cross-sectional view of a second type of the light guide in the B-B direction provided by an embodiment of the present disclosure. The shape of the convex portion 331 is not limited to be semi-elliptical but also can be pyramidal or semi-sphere. When the convex portion 331 is a pyramid, the convex portion 331 may be a triangular pyramid, a quadrangular pyramid and so on. A cross section of the convex portions 331 is triangular in the B-B direction.

Further, as shown in FIG. 4, a width d of each of the convex portions 331 in the second direction a2 is 40 micrometers. In practical applications, the width d of each of the convex portions 331 in the second direction a2 is not limited to 40 micrometers but can also be 30 micrometers, 35 micrometers, 45 micrometers, 50 micrometers and so on. The width d of each of the convex portions 331 is required to be greater than or equal to 30 micrometers and smaller than or equal to 50 microns. As such, a single convex portion 331 can be kept in a reasonable size range to avoid that the effect of the total reflection of the light in the light guide component 31 disrupted by the convex portions 331 is decreased when the width of each of the convex portions 331 in the second direction a2 is too large. In the meantime, it can also be avoided that the density of the convex portions 331 of the array structure 33 is decreased to affect the reflecting function of the reflecting surface 315 on the light when the width of each of the convex portions 331 in the second direction a2 is too large, thereby ensuring the light utilization rate of the light source module 30.

Further, as shown in FIG. 4, a height h of each of the convex portions 331 in the first direction a1 is 3 micrometers. In practical applications, the height h of each of the convex portions 331 in the first direction a1 is not limited to 3 micrometers and can also be 2 micrometers, 2.5 micrometers, 3.5 micrometers, 4 micrometers and so on. The height h of each of the convex portions 331 is only required to be greater than or equal to 2 micrometers and smaller than or equal to 4 micrometers. As such, it can be avoided that the reflection effect of the convex portions 331 on the light is reduced when the height h of the convex portion 331 is too short. In the meantime, it can also be avoided that the infrared light cannot be transmitted to areas away from the light sources when the height h of each of the convex portions 331 is too high, thereby increasing the light utilization rate of the light source module 30.

Further, as shown in FIG. 4, a distance b between two adjacent ones of the convex portions 331 is 0.5 millimeters. In practical applications, the distance b between the two adjacent ones of the convex portions 331 is not limited to 0.5 millimeters but can also be 0.3 millimeters, 0.4 millimeters, or 0.6 millimeters and so on. The distance b between the two adjacent ones of the convex portions 331 is only required to be greater than or equal to 0.3 millimeters and smaller than or equal to 0.6 millimeters. As such, it can avoid that the density of the convex portions 331 of the array structure 33 is reduced when size between the two adjacent ones of the convex portions 331 is too large, thereby ensuring the light utilization rate of the light source module 30.

Figure 6:
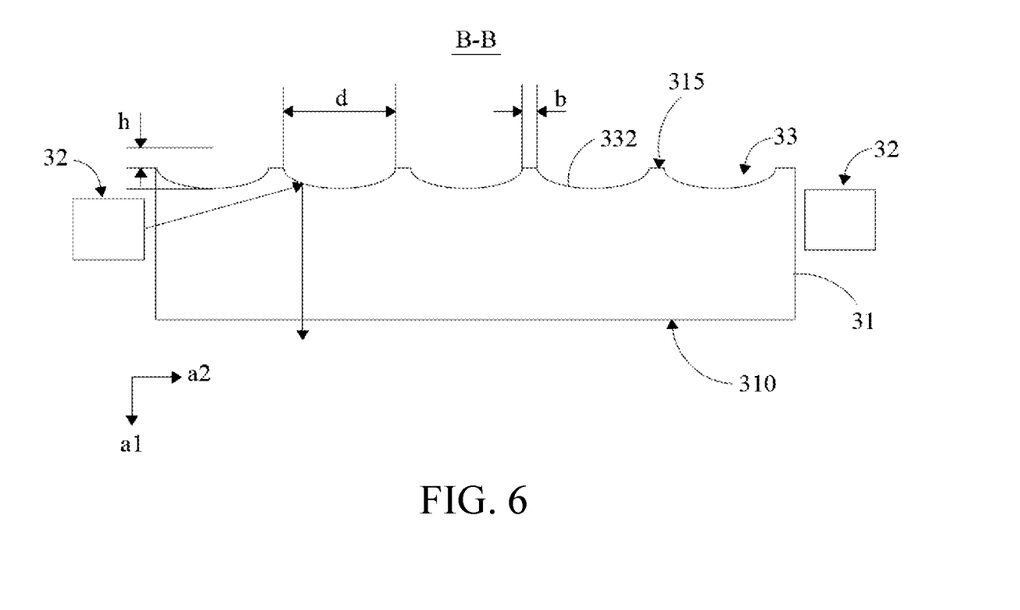
FIG. 6 illustrates a cross-sectional view of a third type of the light guide component in the B-B direction provided by an embodiment of the present disclosure.
Figure 7:
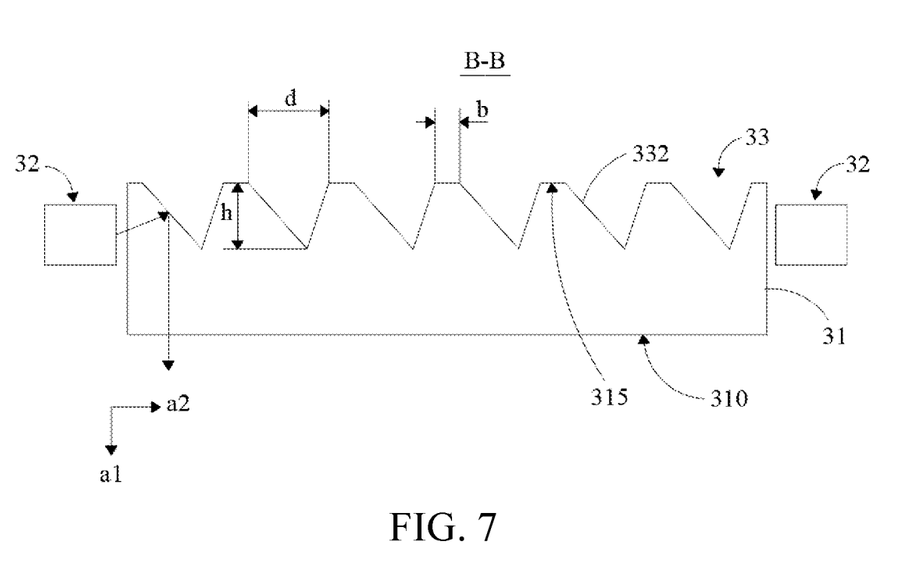
FIG. 7 illustrates a cross-sectional view of a fourth type of the light guide component in the B-B direction provided by an embodiment of the present disclosure.

In other embodiments, as shown in FIG. 6 and FIG. 7, FIG. 6 illustrates a cross-sectional view of a third type of the light guide component in the B-B direction provided by an embodiment of the present disclosure, and FIG. 7 illustrates a cross-sectional view of a fourth type of the light guide component in the B-B direction provided by an embodiment of the present disclosure. The array structure 33 includes a plurality of concave portions 332 which are dented from the reflecting surface 315 in the first direction a1. A function of the convex portions 331 is the same as the function of the convex portions 331 of the light guide components shown in FIG. 4 and FIG. 5 and used to disrupt the total reflection of the light in the light guide component 31 emitted by the light sources 32.

Specifically, as shown in FIG. 6, a cross section of the concave portions 332 is semi-elliptical in the plane where the first direction a1 and the second direction a2 are located. The plane where the first direction a1 and the second direction a2 are located is the cross section in the B-B direction. The second direction a2 is perpendicular to the first direction a1. In practical applications, the cross section of the concave portions 332 in the B-B direction is not limited to be semi-elliptical but can also be semi-circular or triangular as shown in FIG. 7.

Further, similar to the structure of the convex portions 331 in the first type of the light guide 31 shown in FIG. 4, a diameter d of each of the concave portions 332 can also be 30 micrometers, 35 micrometers, 40 micrometers, 45 micrometers, 50 micrometers and so on. The diameter d of each of the concave portions 332 is only required to be greater than or equal to 30 micrometers and smaller than or equal to 50 micrometers.

A depth h of each of the concave portions 332 in the first direction a1 can be 2 micrometers, 2.5 micrometers, 3 micrometers, 3.5 micrometers, 4 micrometers and so on. etc. The depth h of each of the concave portions 332 in the first direction a1 is only required to be greater than or equal to 2 micrometers and smaller than or equal to 4 micrometers.

A distance b between two adjacent ones of the concave portions 332 can be mm, 0.4 mm, 0.5 mm, 0.6 mm and so on., etc. The distance b between the two adjacent ones of the concave portions 332 is only required to be greater than or equal to 0.3 mm and smaller than or equal to 0.6 mm.

Further, as shown in FIG. 2, the display panel 100 further includes a second adhesive layer 60. The second adhesive layer 60 is adhered to the light incident surface 21 of the protective layer 20. The protective layer 20 is adhered to the display panel main body 10 through the above-mentioned second adhesive layer 60.

A refractive index of the second adhesive layer 60 is smaller than the refractive index of the protective layer 20, so that it can be ensured that the outgoing light L1 can be totally reflected in the protective layer 20. A refractive index of the finger 200 is smaller than the refractive index of the protective layer 20, and thus it can be ensured that the finger 200 can destroy the total reflection of the infrared light in the protective layer 20.

Further, the refractive index of the protective layer 20 is n1, and the refractive index of the second adhesive layer 60 is n2. The finger 200 is a user's finger, and its refractive index is n3. The incident angle of the outgoing light L1 emitted to the protective layer 20 is α. Each of the above-mentioned refractive indexes satisfies: arcsin(n2/n1) ≤α≤arcsin(n3/n1). As such, the total reflection of the infrared light in the protective layer 20 can be ensured, and the total reflection of the infrared light in the protective layer 20 can be destroyed by the ridges 210 of the finger, thereby implementing the extraction of the fingerprint feature information.

Specifically, in the embodiment of the present disclosure, the refractive index n2 of the second adhesive layer 60 is 1.2, the refractive index n1 of the protective layer 20 is 1.5, and the refractive index n3 of the finger is measured to be about 1.42. In practical applications, the refractive index of the second adhesive layer 60 is not limited to but can also be 1.1 or 1.3. The refractive index of the second adhesive layer 60 is only required to be greater than or equal to 1.1 and smaller than or equal to 1.3. The refractive index of the protective layer 20 is not limited to 1.5 but can also be 1.6, 1.7 and so on. The refractive index of the protective layer 20 is only required to be greater than or equal to 1.5 and smaller than or equal to 1.7.

As shown in FIG. 2, the display panel 100 further includes a collimating grating structure 70. The collimating grating structure 70 is disposed at a side of the light sensor 40 close to the display panel main body 10. A function of the collimating grating structure 70 is to provide a collimated light path to converge the infrared light reflected by the finger, penetrating the display panel main body 10, and carrying the fingerprint feature information, thereby increasing the infrared light carrying the fingerprint feature information and received by the light sensor 40 and increasing the accuracy of the fingerprint recognition of the electronic device.

Figure 8:
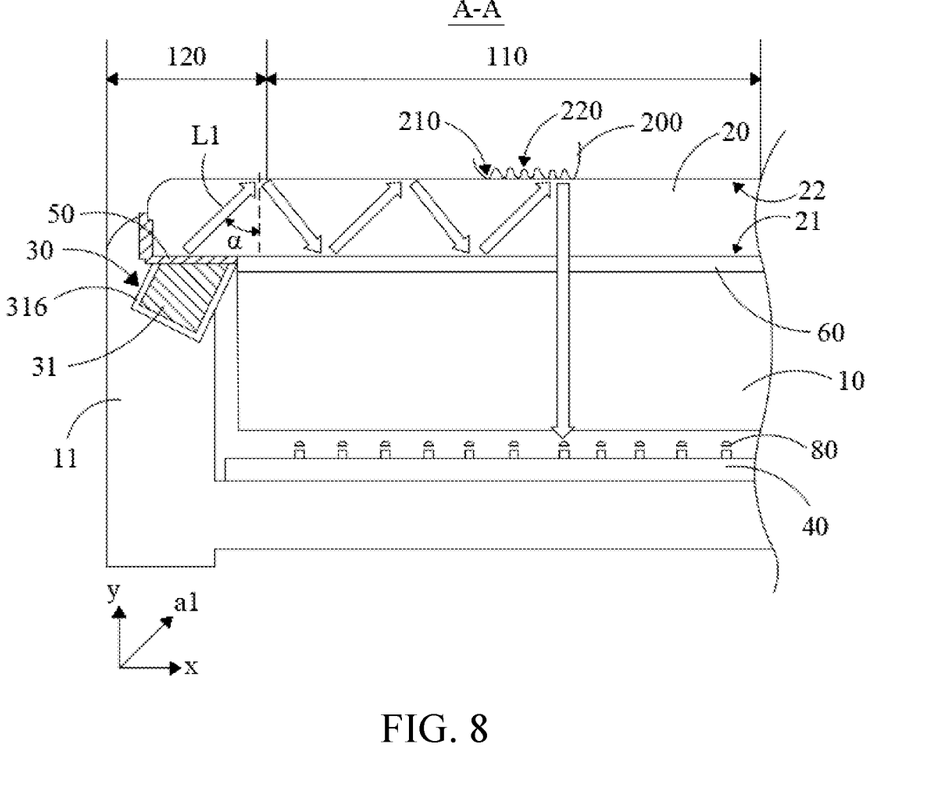
FIG. 8 illustrates a cross-sectional view of a second type of the display panel in the A-A direction provided by an embodiment of the present disclosure.

As shown in FIG. 8. FIG. 8 illustrates a cross-sectional view of a second type of the display panel in the A-A direction provided by an embodiment of the present disclosure. A difference different from the first type of the display panel shown in FIG. 2 is that the second type of the display panel shown in FIG. 8 does not include the collimating grating structure 70 but includes a microlens array structure 80. The microlens array structure 80 is disposed at the side of the light sensor 40 close to the display panel main body 10. The microlens array structure 80 includes a plurality of lenses arranged in an array, and its function is the same as a function of the collimating grating structure 70 and is not repeated herein.

Advantageous effects of the embodiments of the present disclosure are described as follows. The embodiments of the present disclosure provide a display panel and an electronic device. The electronic device includes the display panel. The display panel includes a display panel main body, a protective layer, a light source module, and a light sensor. The protective layer is disposed on a light emitting side of the display panel main body. A light emitting surface of the light source module faces a light incident surface of the protective layer. The light sensor is disposed at a side of the display panel main body away from the protective layer. Outgoing light emitted by the light source module enters the protective layer in a first direction, and an angle α between the first direction and a thickness direction of the protective layer is greater than a critical angle of the outgoing light on a light emitting surface of the protective layer. As such, the light emitted by the light source module can be totally reflected in the protective layer. When a user's finger used for fingerprint recognition touches any one area of the protective layer corresponding to a display area of the display panel main body, the light emitted to the finger can be reflected to light sensor. A range of under-screen fingerprint recognition of the display panel and the electronic device can be increased, and convenience of the fingerprint recognition is increased.

In summary, while the present disclosure is described in connection with preferred embodiments, the preferred embodiments are not intended to limit the present disclosure. Those skilled in the art can make various changes and modifications without departing from the spirit and scope of the present disclosure. Accordingly, the protection scope of the present disclosure is based on the scope defined by the claims.

What is claimed is:

1. A display panel, comprising:
   a display panel main body;
   a protective layer disposed at a light emitting side of the display panel main body;
   a light source module, a light emitting surface of the light source module facing a light incident surface of the protective layer; and
   a light sensor disposed at a side of the display panel main body away from the protective layer;
   wherein outgoing light emitted by the light source module enters the protective layer in a first direction, and in a cross sectional viewing angle, an angle between the first direction and a thickness direction of the protective layer is greater than a critical angle of the outgoing light on a light emitting surface of the protective layer; and
   wherein the light source module comprises:
   a light guide component, a light emitting surface of the light guide component facing the light incident surface of the protective layer, wherein a reflective layer is disposed on surfaces of the light guide component, and the reflective layer exposes the light incident surface and the light emitting surface of the light guide component.

2. The display panel of claim 1, wherein the light source module further comprises:
   at least one light source, the at least one light source disposed at at least one light incident side of the light guide component.

3. The display panel of claim 2, wherein the light guide component comprises a reflecting surface opposite to the light emitting surface, the reflecting surface is arranged in an array structure, and the array structure has an uneven surface.

4. The display panel of claim 3, wherein the array structure comprises a plurality of convex portions protruding from the reflecting surface in a direction opposite to the first direction, and the convex portions are semi-elliptical, pyramidal, or semi-sphere; or
   the array structure comprises a plurality of concave portions dented from the reflecting surface in the first direction, and the concave portions are triangular, semicircular, or semi-elliptical.

5. The display panel of claim 1, wherein the display panel further comprises a first adhesive layer, and the first adhesive layer is adhered between the light emitting surface of the light source module and the incident surface of the protective layer;
   wherein a refractive index of the first adhesive layer is greater than a refractive index of the protective layer.

6. The display panel of claim 5, wherein the refractive index of the first adhesive layer is greater than or equal to 1.5 and smaller than or equal to 1.8.

7. The display panel of claim 1, wherein the display panel further comprises a second adhesive layer, and the second adhesive layer is adhered to the light incident surface of the protective layer;
   wherein a refractive index of the second adhesive layer is smaller than a refractive index of the protective layer, and a refractive index of a finger is smaller than the refractive index of the protective layer.

8. The display panel of claim 7, wherein the refractive index of the protective layer is n1, the refractive index of the second adhesive layer is n2, the refractive index of the finger is n3, and an incident angle of the outgoing light emitted to the protective layer is a;
   wherein $\arcsin(n2/n1) \le \alpha < \arcsin(n3/n1)$.

9. The display panel of claim 7, wherein the refractive index of the second adhesive layer is greater than or equal to 1.1 and smaller than or equal to 1.3, and the refractive index of the protective layer is greater than or equal to 1.5 and smaller than or equal to 1.7.

10. The display panel of claim 1, wherein the display panel comprises a display area and a frame area surrounding the display area, and the light source module is disposed in the frame area.

11. An electronic device, comprising a display panel, the display panel comprising:
- a display panel main body;
- a protective layer disposed at a light emitting side of the display panel main body;
- a light source module, a light emitting surface of the light source module facing a light incident surface of the protective layer; and
- a light sensor disposed at a side of the display panel main body away from the protective layer;
- wherein outgoing light emitted by the light source module enters the protective layer in a first direction, and in a cross sectional viewing angle, an angle between the first direction and a thickness direction of the protective layer is greater than a critical angle of the outgoing light on a light emitting surface of the protective layer; and
- wherein the light source module comprises:
  - a light guide component, a light emitting surface of the light guide component facing the light incident surface of the protective layer, wherein a reflective layer is disposed on surfaces of the light guide component, and the reflective layer exposes the light incident surface and the light emitting surface of the light guide component.

12. The electronic device of claim 11, wherein the light source module further comprises:
- at least one light source, the at least one light source disposed at at least one light incident side of the light guide component.

13. The electronic device of claim 12, wherein the light guide component comprises a reflecting surface opposite to the light emitting surface, the reflecting surface is arranged in an array structure, and the array structure has an uneven surface.

14. The electronic device of claim 13, wherein the array structure comprises a plurality of convex portions protruding from the reflecting surface in a direction opposite to the first direction, and the convex portions are semi-elliptical, pyramidal, or semi-sphere; or
the array structure comprises a plurality of concave portions dented from the reflecting surface in the first direction, and the concave portions are triangular, semi-circular, or semi-elliptical.

15. The electronic device of claim 11, wherein the display panel further comprises a first adhesive layer, and the first adhesive layer is adhered between the light emitting surface of the light source module and the incident surface of the protective layer;
wherein a refractive index of the first adhesive layer is greater than a refractive index of the protective layer.

16. The electronic device of claim 15, wherein the refractive index of the first adhesive layer is greater than or equal to 1.5 and smaller than or equal to 1.8.

17. The electronic device of claim 11, wherein the display panel further comprises a second adhesive layer, and the second adhesive layer is adhered to the light incident surface of the protective layer;
wherein a refractive index of the second adhesive layer is smaller than a refractive index of the protective layer, and a refractive index of a finger is smaller than the refractive index of the protective layer.

18. The electronic device of claim 17, wherein the refractive index of the protective layer is n1, the refractive index of the second adhesive layer is n2, the refractive index of the finger is n3, and an incident angle of the outgoing light emitted to the protective layer is a;
wherein $\arcsin(n2/n1) \leq \alpha < \arcsin(n3/n1)$.

\* \* \* \* \*